United States Patent [19]
Ogiro et al.

[11] Patent Number: 6,137,759
[45] Date of Patent: Oct. 24, 2000

[54] REMOVABLE DISK DRIVE SYSTEM HAVING A DRIVING MECHANISM AND REMOVABLY HOUSING A DISC CARTRIDGE

[75] Inventors: Kenji Ogiro, Yokohama; Nobuo Masuoka, Chigasaki, both of Japan

[73] Assignee: Hitachi, Ltd., Tokyo, Japan

[21] Appl. No.: 08/899,442

[22] Filed: Jul. 24, 1997

[30] Foreign Application Priority Data

Sep. 20, 1996 [JP] Japan .................................... 8-249378
Sep. 20, 1996 [JP] Japan .................................... 8-249379
Sep. 20, 1996 [JP] Japan .................................... 8-249380

[51] Int. Cl.[7] ............................................... G11B 17/035
[52] U.S. Cl. ............................................................ 369/75.2
[58] Field of Search ................................. 369/75.1, 75.2, 369/77.1, 77.2; 235/487–493; 361/683–686; 360/99.02, 99.06

[56] References Cited

U.S. PATENT DOCUMENTS 5,214,550 5/1993 Chan ..................................... 360/97.01
5,355,357 10/1994 Yamamori et al. ..................... 369/75.2

FOREIGN PATENT DOCUMENTS

0721187 7/1996 European Pat. Off. .

Primary Examiner—George J. Letscher
Attorney, Agent, or Firm—Mattingly, Stanger & Malur, P.C.

[57] ABSTRACT

A removable disk drive system for mounting a disk cartridge containing a disk, and adapted to be detachably connected to external equipment through a PC card slot therein specified under a PCMCIA standard, and thereby to be operative with the external equipment having the PC card slot. The removable disk drive system includes: a connector specified under the PCMCIA standard; a disk drive body having an external shape continuous with the connector provided on one side of the disk drive body, at least a portion of the disk drive body having an external shape complying with the PCMCIA standard so as to be insertable into the PC card slot when the disk is operational in the disk drive body; a tray pivotally attached on the disk drive body by a hinge disposed on a side of the disk drive body opposite the connector, for detachably receiving the disk cartridge, the tray having an opening for inserting the cartridge into the tray therethrough at an end portion of the tray on a connector side thereof or a position displaced toward the end portion, and a container continuous with the disk drive body for containing at least part of a recording and reproducing mechanism for recording information on and reproducing information from the disk contained in the disk cartridge on a side of the disk drive body opposite the connector.

3 Claims, 7 Drawing Sheets

REMOVABLE DISK DRIVE SYSTEM HAVING A DRIVING MECHANISM AND REMOVABLY HOUSING A DISC CARTRIDGE

BACKGROUND OF THE INVENTION

The present invention relates to a disk-recording and reproducing apparatus utilizing optical storage or magneto-optical storage technology or the like, and a disk cartridge therefor.

Advance of a digital technology increases data to be processed, and media for recording and reproducing data are being developed in accordance with individual applications. Specific examples of the recording and reproducing media used for computers, etc. include a magnetic disk, an optical disk, a semiconductor memory, and a magnetic tape device. In particular, media for optical disk-recording and -reproducing are advantageous in terms of reduced cost per capacity due to expandability in capacity by replacement of optical disks, random accessibility, and ease of manufacture of optical disks used exclusively for reproduction.

Some people desire to use hardware employing these recording and reproducing media outdoors as well as indoors. A miniature personal computer, a PDA (Personal Digital Assistant), a handy game machine, a handy "sing along" set and an electronic still camera, for example, satisfy these demands. If the amount of information is small, a semiconductor memory is used as the data recording medium. The semiconductor memory has the merits that it is small in power consumption, immune from troubles because of no mechanism, high in data transfer rate, and the like. On the other hand, the semiconductor memory is high in cost per capacity, and accordingly, it is not suitable for a large amount of recording and reproducing.

By contrast, a hard-disk drive system in magnetic disk systems is high in data transfer rate, though lower than the semiconductor memory, and low in cost per capacity, and accordingly, it is suitable for a large amount of recording. The hard-disk drive system requires a drive mechanism for performing recording and reproducing of data with a magnetic head brought into close proximity to a hard disk, and for rotating the disk at a high speed; however, it can realize size-reduction to some extent, since there has been already developed a magnetic hard disk of 1.8 inches or 2.5 inches in diameter.

SUMMARY OF THE INVENTION

Of the prior art media, the semiconductor memory is not suitable for large capacity recording and reproducing because it is high in cost per capacity, although it is small in size, low in power-consumption, and high in data transfer rate. The hard-disk drive system is high in data transfer rate and low in cost per capacity; however, a capacity of a hard disk cannot be increased because it cannot be singly removed, but it must be removed together with a recording and reproducing drive. In view of the foregoing, there have been demands for development of removable media usable for a portable hardware enabling size-reduction, large capacity, and low cost thereof.

For an interface of a small-sized hardware, there is known a PC Card Standard employing a card-type medium and called PCMCIA (Personal Computer Memory Card International Association; hereinafter referred to as a PC card). For a personal computer including a hardware body having a PC card connector, a magnetic disk system or an optical disk system can be provided as an external memory of the personal computer using a PC card, for example, of SCSI (Small Computer System Interface), connected to the connector and also data can be transferred to another personal computer at a high transfer rate using a LAN connection PC card.

The hard disk system or optical disk system employing the PC card as an interface, however, cannot be housed in a portable hardware, that is, it obstructs portability. On the other hand, some of the small-sized hard disk systems and semiconductor memories have shapes specified under the PC card standard, which can be connected to the PC connectors contained in portable hardware. However, as described above, the PC card employing a semiconductor memory is high in cost of increasing capacity to a large extent. In the case of the hard disk system employing magnetic disks, the number of the magnetic disks must be increased in the PC card for increasing the capacity; however, since the thickness of the PC card is restricted to 10.5 mm at maximum for TYPE III in the card standard of PCMCIA, it is difficult to increase the number of the magnetic disks in consideration of restriction of the shape of the drive mechanism. To solve the above-described problems, there is be considered a high density optical or magneto-optical disk (hereinafter referred to as an optical disk).

Accordingly, an object of the present invention is to provide a disk cartridge used for portable hardware, and a disk drive system therefor.

A card-type disk cartridge of the present invention has a cartridge housing of a card-type rectangular planar shape. A connector is provided in the cartridge housing on one short side thereof, and an optical disk, for instance, is contained and displaced toward the short side opposite the connector in the cartridge housing. The plane of the cartridge housing facing the disk has an opening for bringing a recording and reproducing mechanism into close proximity to the disk therethrough. A shutter for opening and closing the opening is also provided on the plane of the cartridge housing.

The opening has a rectangular planar area which faces a half or more of the area of the disk, including a connection portion provided on a central portion of the disk for coupling the disk with a drive motor and also including at least two perpendicular radii on the surface of the disk.

With this configuration, the recording and reproducing mechanism of the disk drive system can be brought into close proximity to the disk without involving the cartridge housing, so that the disk system can be thinned.

The disk drive system for mounting the disk cartridge includes: a connector specified under the PCMCIA standard; a disk drive body including a portion in shape continuous with the connector and having an external shape complying with the PCMCIA standard; a tray, liftably mounted on the disk drive body, for removably housing the disk cartridge; and a recording and reproducing mechanism, mounted in the disk drive body, for recording information on and reproducing information from the disk housed in the disk cartridge.

The tray for housing the cartridge is pivotably attached on the disk drive body by a hinge provided in a position remote from the connector, and it has on the connector side an opening for inserting the disk cartridge. A container for containing a component such as the recording and reproducing mechanism may be provided, as needed, on the disk drive body opposite the connector in such a manner as to be continuous with the disk drive body.

The disk drive system having the above configuration is capable of recording information on and reproducing information from the small-sized disk cartridge usable for portable hardware.

DESCRIPTION OF THE PREFERRED EMBODIMENTS

Hereinafter, embodiments of the present invention will be described with reference to the drawings. First, there will be described an embodiment shown in FIG. 1.

Figure 1:
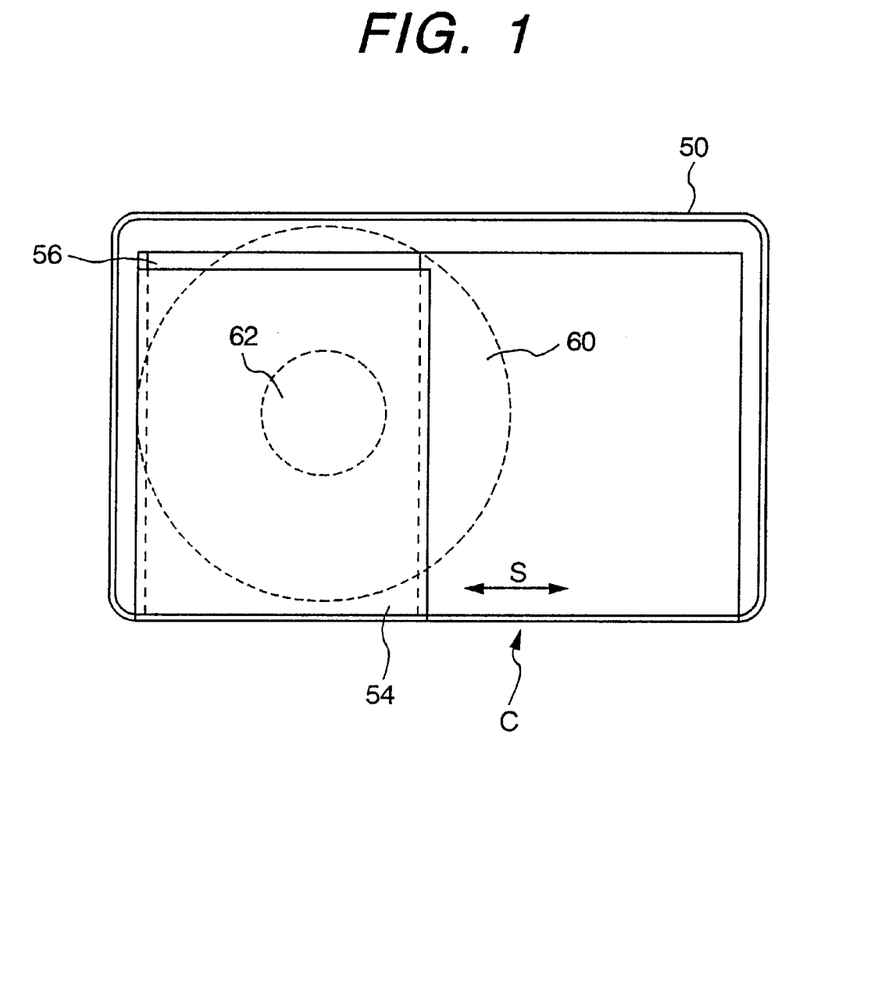
FIG. 1 is a plan view of an optical disk cartridge of an embodiment of the present invention.
Figure 2:
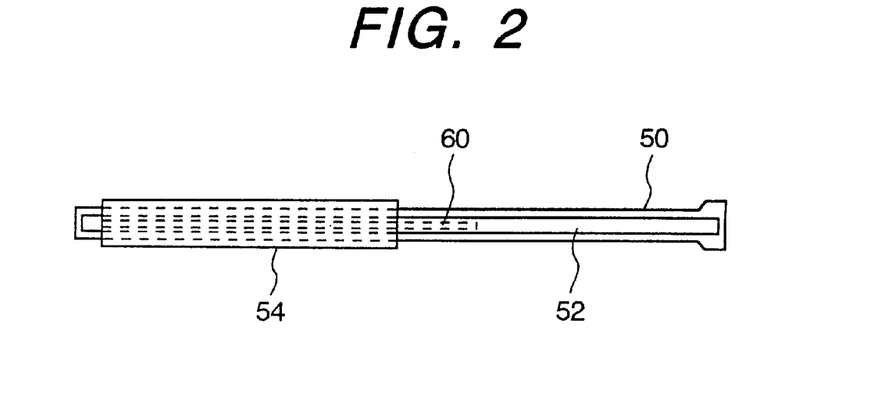
FIG. 2 is a side elevational view of the optical disk cartridge of FIG. 1 viewed in the direction of the arrow C.

FIG. 1 is a plan view of an optical disk cartridge of an embodiment of the present invention, and FIG. 2 is a side elevational view of the optical disk cartridge of FIG. 1 viewed in the direction of the arrow C.

An optical disk cartridge housing 50 has a box-like body with a card-type planar shape, and it houses an optical disk 60 in an internal space 52.

The optical disk 60 has a diameter of 45 mm, for example. The cartridge for housing the optical disk 60 has a small-sized card type shape with a long side of about 68 mm, a short side of about 48 mm, and a thickness of about 3.5 mm. Each dimension of the cartridge is, of course, dependent on the diameter of an optical disk. The optical disk 60 is housed in the optical disk cartridge in such a manner as to be displaced toward one short side thereof.

At least one of upper and lower surfaces of the optical disk cartridge housing 50 has a rectangular opening 56 opposed to the optical disk 60, and is mounted with a shutter 54 for opening and closing the opening 56. The shutter 54 is mounted slidably in the direction of the arrow S.

The opening 56 provided in the optical disk cartridge housing 50 has a large size allowing a half or more of the surface of the optical disk 60 housed in the housing 50 to be exposed therefrom. The opening 56 has a continuous planar area covering a drive portion 62 at the center of the optical disk 60 adapted to abut against a drive motor and also covering at least two perpendicular radii.

Figure 7:
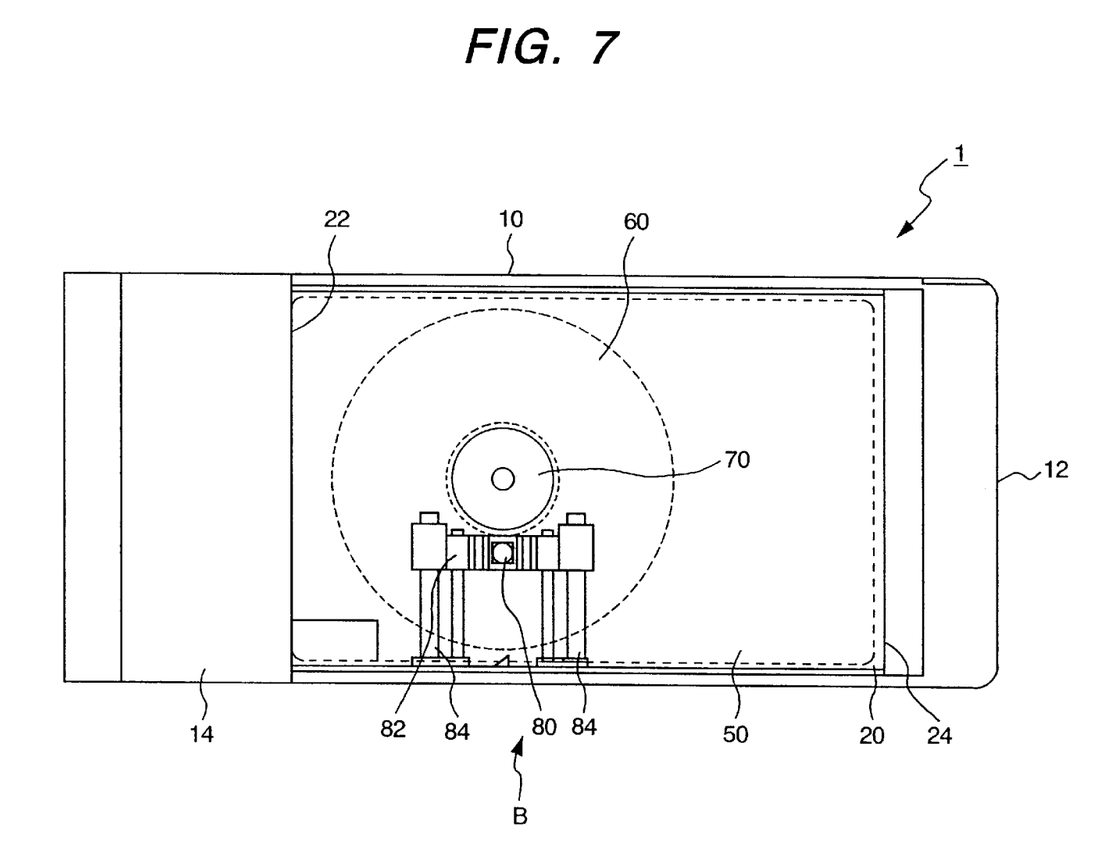
FIG. 7 is a plan view of the optical disk drive system of the embodiment of the present invention showing a portion of a recording and reproducing apparatus thereof.

Accordingly, as shown in FIG. 7 which will be referred to for more details, a recording and reproducing mechanism including a drive motor 70 and a head 80 mounted on the body 10 can be brought into close proximity to the optical disk 60 housed in the optical disk cartridge housing 50 through the large-sized opening 56. The mounting design of the recording and reproducing mechanism in the thickness direction of the body 10 is thus facilitated on the basis of the fact that positioning of the recording and reproducing mechanism in close proximity to the optical disk 60 is not obstructed by the optical disk cartridge housing 50.

Figure 3:
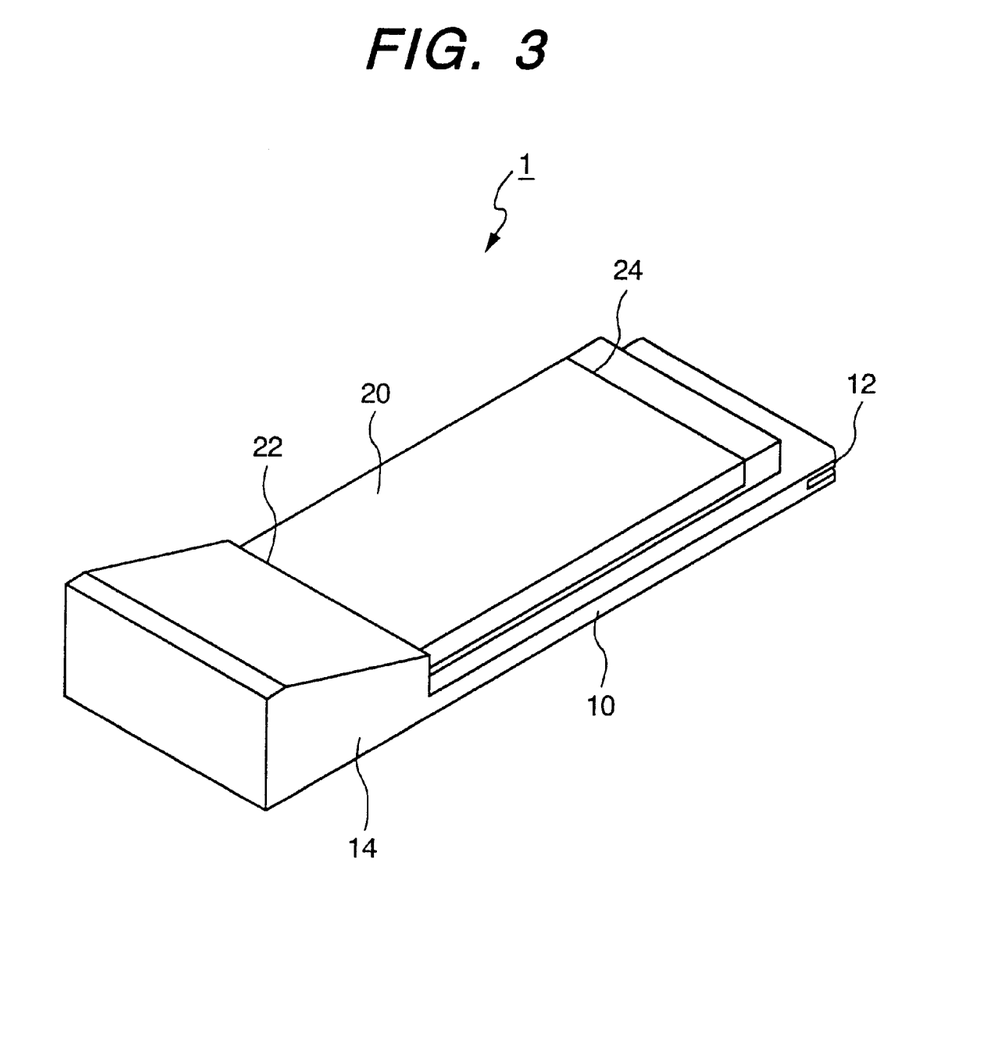
FIG. 3 is a perspective view of an optical disk drive system.

FIG. 3 is a schematic perspective view of an optical disk drive system for recording information on and reproducing information from the optical disk 60 housed in the optical disk cartridge of the present invention.

The optical disk drive system, represented generally by reference numeral 1, has a PC card type body 10. The body 10 has on one short side a connector 12 corresponding to a PC card. A portion of the body 10 on the connector 12 side has an external shape which can plug into a PC card slot provided in a portable hardware. A portion 14 continuous to the body 10, which is to be positioned outside a PC card slot after the body 10 is plugged into the PC card slot, may be designed to serve as a container for containing components of the optical disk drive system by enlarging, for example, the dimension in the thickness direction of the body 10.

On the upper surface of the body 10, is mounted a tray 20 for housing the optical disk cartridge containing the optical disk. The tray 20 is pivotably attached by a hinge 22 mounted on a short side of the body 10 opposite the connector 12 , and it has at an end portion remote from the hinge 22 an opening 24 through which the optical disk cartridge is insertable.

Figure 4:
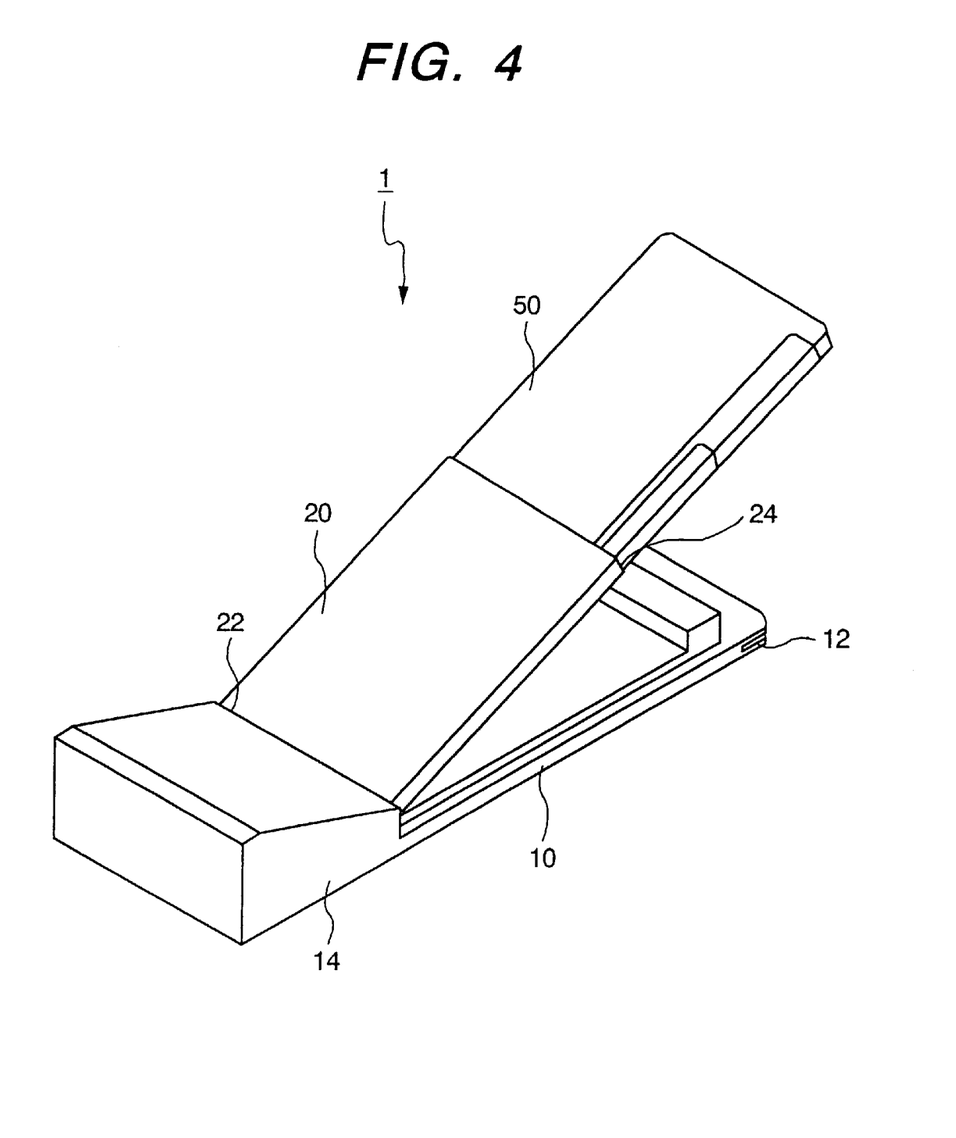
FIG. 4 is a perspective view of the optical disk drive system of an embodiment of the present invention showing a state in which a tray is lifted.

FIG. 4 shows a state in which the tray 20 of the optical disk drive system 1 is lifted from the body 10 on the hinge 22. In the state in which the tray 20 is lifted, the optical disk cartridge 50 containing the optical disk can be mounted in and dismounted from the tray 20 through the opening 24.

Figure 5:
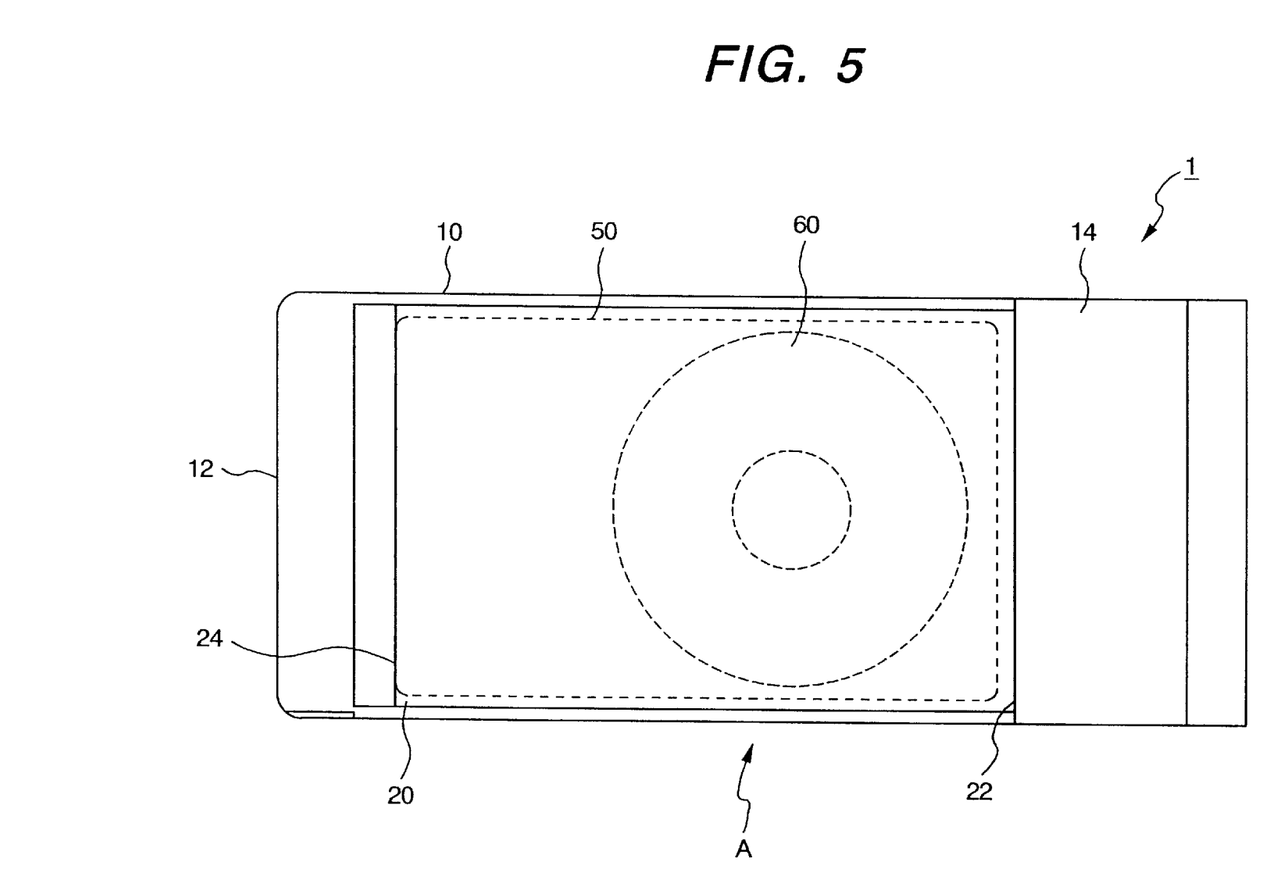
FIG. 5 is a plan view of the optical disk drive system of the embodiment of the present invention showing a state in which an optical disk cartridge is housed therein.
Figure 6:
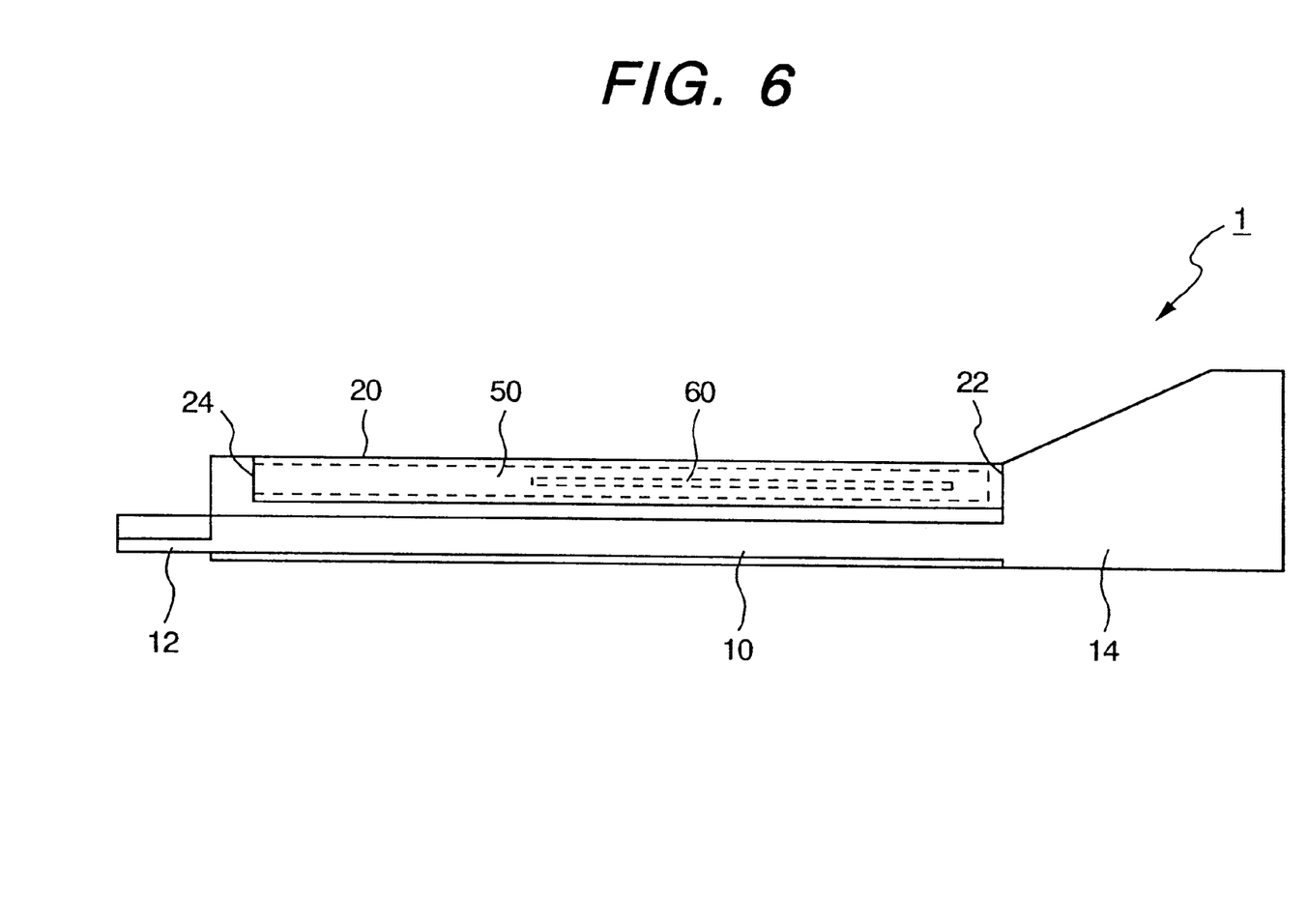
FIG. 6 is a side elevational view of the optical disk drive system of FIG. 5 viewed in the direction of the arrow A.

FIG. 5 is a plan view of the optical disk drive system 1 showing a state in which the optical disk cartridge 50 is inserted in the tray 20, and FIG. 6 is a side elevational view of the optical disk drive system 1 of FIG. 5 viewed in the direction of the arrow A.

When the optical disk cartridge 50 containing the optical disk 60 is inserted in the tray 20 of the optical disk drive system 1 such that the optical disk 60 is positioned in a position remote from the connector 12 and then the tray 20 is lowered on the hinge 22, the shape of the optical disk drive system 1 is returned to the card-type one which can plug into the PC card slot.

The insertion of the optical disk cartridge 50 into the tray 20 causes the shutter 54 to expose the opening 56, while the drawing of the optical disk cartridge 50 from the tray 20 causes the shutter 54 to close the opening 56.

Figure 8:
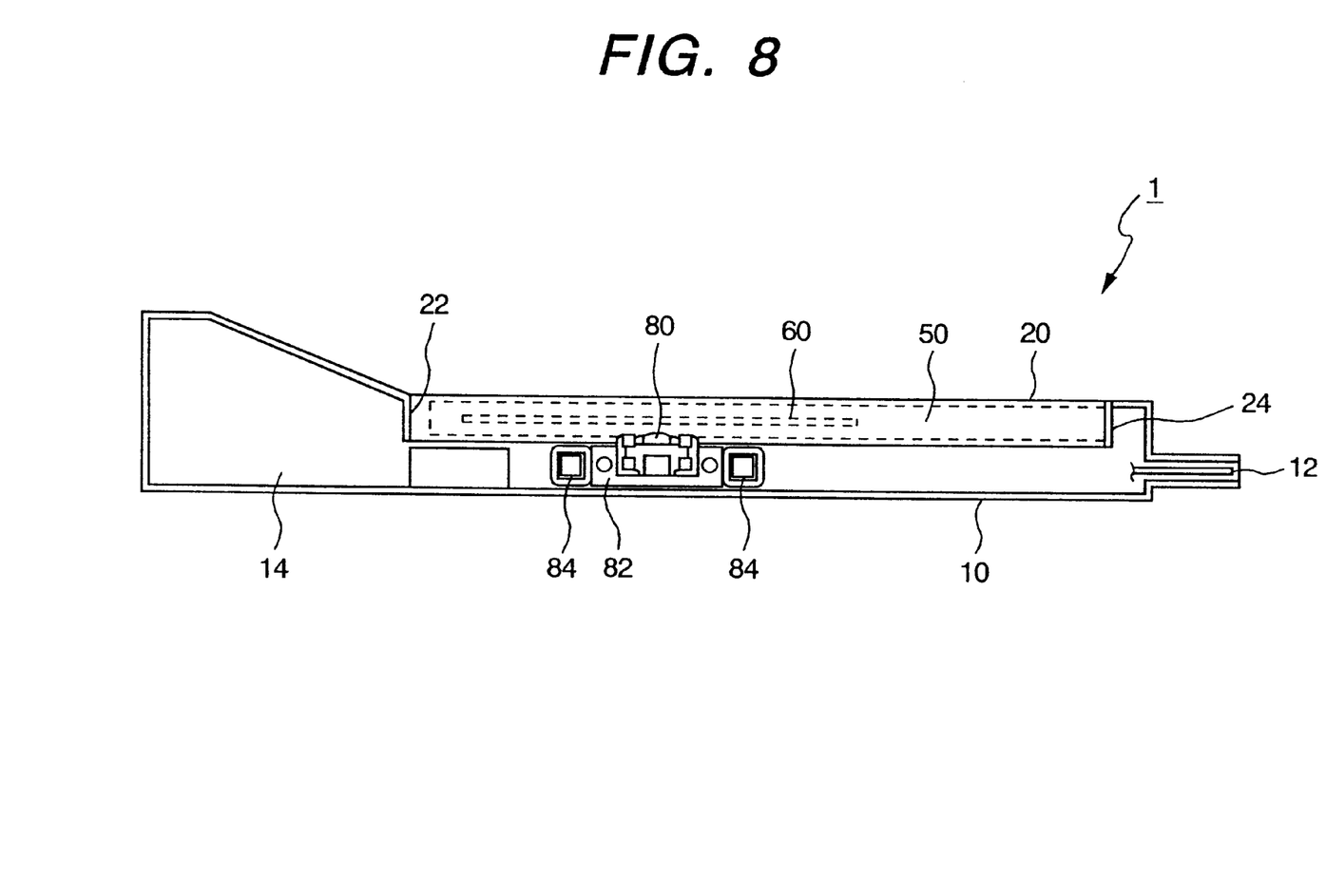
FIG. 8 is a side elevational view of the recording and reproducing apparatus of FIG. 7 viewed in the direction of the arrow B.

FIG. 7 is a plan view showing part of the recording and reproducing mechanism mounted in the optical disk drive system 1, and FIG. 8 is a side elevational view of the recording and reproducing mechanism of FIG. 7 viewed in the direction of the arrow B.

The body 10 includes the drive motor 70 for driving the optical disk 60 contained in the optical disk cartridge 50 inserted in the tray 20, and the head 80 for recording information on and reproducing information from the optical disk 60. The head 80 is mounted on a carriage 82 movable along a guide 84 in the radial direction of the optical disk 60.

The recording and reproducing mechanism including the drive motor 70 and the recording and reproducing head 80 is disposed in the body 10 in such a manner as to be displaced toward the short side opposite the connector 12.

The body 10, having the shape specified under the standard of the PC card, is very restricted in the space, particularly, in the thickness direction, available for disposition of the recording and reproducing mechanism.

The container 14 continuous with the body 10, which is provided as needed, is positioned outside the PC card slot of the mating hardware when the optical disk drive system 1 is plugged into the PC card slot, and it can be formed into a shape larger than the size of the opening of the slot. In addition, part of the recording and reproducing mechanism positioned in close proximity to the container 14 can be disposed in the container 14. This improves the degree of freedom in design of the recording and reproducing mechanism.

As described above, the card type optical disk cartridge of the present invention is configured such that an optical disk is mounted in the optical disk cartridge in such a manner as to be displaced toward one short side of the cartridge, and that the opening provided in the cartridge for allowing the recording and reproducing mechanism to be brought into close proximity to the optical disk has a size sufficient to allow a half or more of the surface of the optical disk to be exposed therefrom. The provision of such a large-sized opening allows the mechanism for recording information on and reproducing information from the optical disk to be brought into close proximity to the optical disk through the opening. This enables the drive system to be thinned.

This small-sized optical disk drive system has the body having the external size equivalent to that of a PC card specified under the PCMCIA standard, and the connector corresponding to the PC card; and it is capable of recording information on and reproducing information from the card type optical disk cartridge removably housed in the optical disk drive system.

Since the optical disk drive system is designed to comply with the PCMCIA standard, it can plug into each slot of various electronic devices for transmission of information. Moreover, since the optical disk cartridge is used interchangeably, it can be available for various applications.

It is needless to say that the present invention is applicable to other memory devices for use with disk-type memory media, as well as memory devices utilizing optical disks.

What is claimed is:

1. A removable disk drive system for mounting a disk cartridge containing a disk, and adapted to be detachably connected to external equipment through a PC card slot therein specified under a PCMCIA standard, and thereby to be operative with the external equipment having the PC card slot, said removable disk drive system comprising:

a connector specified under the PCMCIA standard;

a disk drive body having an external shape continuous with said connector provided on one side of said disk drive body, at least a potion of said disk drive body having an external shape complying with the PCMCIA standard so as to be insertable into the PC card slot when said disk is operational in said disk drive body;

a tray pivotally attached on said disk drive body by a hinge disposed on a side of said disk drive body opposite said connector, for detachably receiving said disk cartridge, said tray having an opening for inserting said cartridge into said tray therethrough at an end portion of said tray on a connector side thereof or a position displaced toward said end portion; and a container continuous with said disk drive body for containing at least part of a recording and reproducing mechanism for recording information on and reproducing information from said disk contained in said disk cartridge on a side of said disk drive body opposite said connector.

2. A removable disk drive system according to claim 1, wherein said disk, when operational in said disk drive body, is displaced toward a side of said disk drive body opposite said connector.

3. A removable disk drive system according to claim 1, wherein the container has a shape that is larger than said portion that complies with the PCMCIA standard, such that the container is not inserted in said PC card slot when said removable disk drive system is operatively connected to the external equipment.

* * * * *